Figure 1:
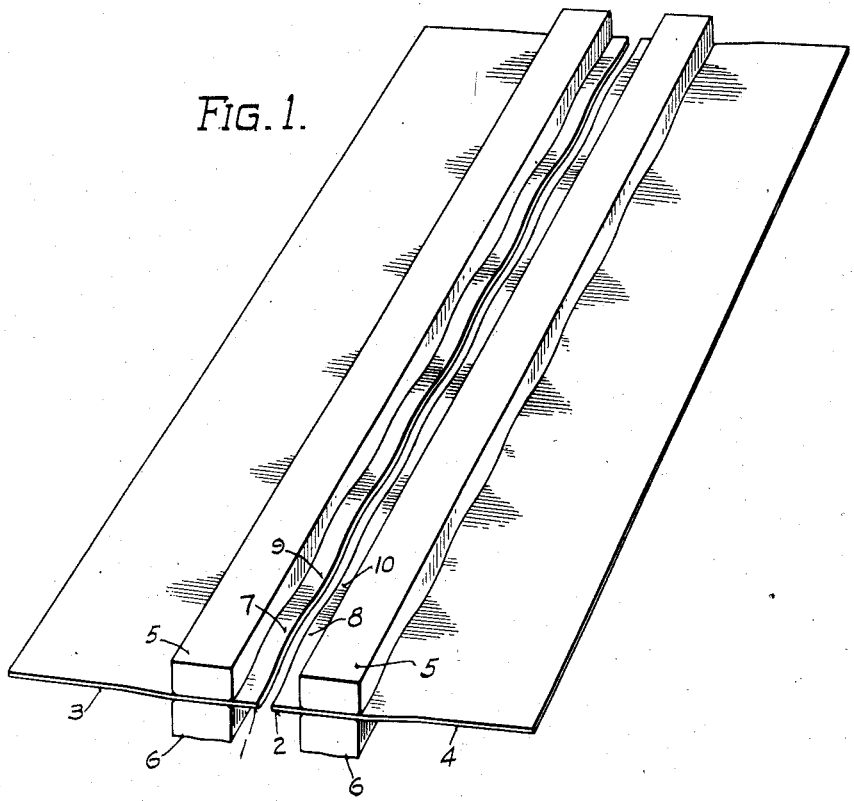

July 10, 1934.  H. MILLER  1,966,210

PROCESS OF ELECTRIC FLASH WELDING

Filed July 3, 1933

INVENTOR.
Henry Miller
BY
ATTORNEY.

Patented July 10, 1934

1,966,210

UNITED STATES PATENT OFFICE 1,966,210

PROCESS OF ELECTRIC FLASH WELDING

Henry Miller, Milwaukee, Wis., assignor to A. O. Smith Corporation, Milwaukee, Wis., a corporation of New York Application July 3, 1933, Serial No. 678,758

3 Claims. (Cl. 219—10)

This invention relates to a process of electric flash welding.

In the welding of long thin sheets by this process, considerable difficulty is encountered in obtaining proper alignment of the edges and in preventing wrinkling of the seam or sheet metal adjacent thereto. This difficulty is largely due to the tendency of the edges upon becoming heated by the flashing arc to expand longitudinally and to wrinkle or buckle at unpredetermined points. This results in misalignment of the edges at the final upsetting or abutment thereof since a buckle on one edge will seldom meet a similar one on the opposite edge. In fact, the buckle of the two opposing edge portions is often in the opposite direction, resulting in a slipping of one edge over the other during upsetting and an imperfect weld.

In some instances where the edges are clamped straight, the metal is compelled to upset and thicken when heating instead of expanding longitudinally. Then when the weld is complete and the seam is cooling, stresses are set up in the seam which tend to produce transverse cracks or to strain and buckle the metal adjacent to the seam.

The object of the present invention is to overcome these and other difficulties in flash welding long thin sheets and to provide a process which will obtain greater accuracy in alignment of the edges and to compensate for the contraction of the seam longitudinally upon cooling.

According to the invention, the edges are given a predetermined wave contour in clamping them for welding, as illustrated in the preferred embodiment shown in the drawing.

Figure 1 of the drawing is a perspective view of two opposed edges of sheets to be welded.

Figure 2:
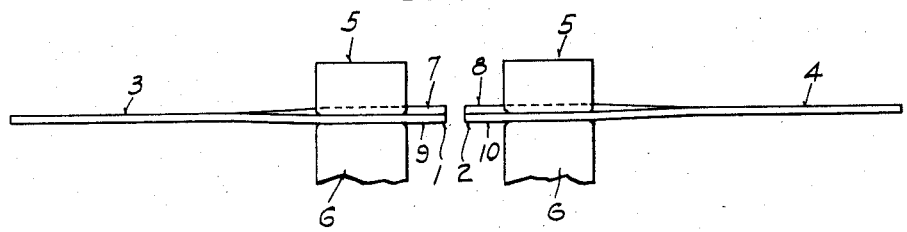

Fig. 2 is a transverse section across the seam cleft showing the application of electrodes and clamping bars.

The edges 1 and 2 are normally fairly straight. When they are placed in the flash welding machine and clamped between the electrodes 5 and clamping bars 6, they receive a predetermined wave-like contour as illustrated in the drawing. The faces of the electrodes 5 and clamping bars 6 are of corresponding wave-like contour in order to impart this shape to the clamped edges.

The crests 7 of the waves in the edge 1 correspond with and meet the crests 8 of the waves in the edge 2. Likewise, the troughs 9 of the waves in the edge 1 correspond with and meet the troughs 10 of the waves in the edge 2. The depth of the waves from the tops of the crests to the bottoms of the troughs are preferably alike throughout the length of the edges although it may be varied to suit conditions and may be greater at the center than at the ends. This depth is preferably about $\frac{1}{16}''$, more or less, where the sheets 3 and 4 are from $\frac{1}{16}''$ to $\frac{1}{8}''$ in thickness.

The distance from crest to crest of the waves may be varied to suit conditions. In the case of waves of the dimensions above indicated, the distance from crest to crest may be preferably from one to two feet.

In welding the edges, an electric current is first applied across the seam between the electrodes in a manner establishing a flashing arc between the opposed edge portions. During the flashing period, the edge portions are gradually flashed away until about half the metal between the original edges and the electrodes has been disposed of. Then the edges are pressed together and the heated metal upset to provide the weld, the electrodes 5 approaching close to each other in this final operation.

The edge portions ordinarily become heated to very nearly the same temperature during the flashing operation and will tend to expand to the same degree. By providing the wave-like contour, this expansion of the metal longitudinally of the edges is controlled so that the waves are accentuated. Instead of expanding longitudinally of the sheet, the longitudinal expansion of the edges is directed upwardly at the crests of the waves and downwardly at the troughs. This expansion is uniform and equal for the opposing edge portions, and prevents the setting up of unpredetermined wrinkles or buckles in the edges which cause misalignment.

Since the opposing edge portions are at all times in transverse alignment, the upsetting of the edges is obtained uniformly throughout the length of the seam.

The waves in the edges are partially removed and the seam straightened by the contracting of the metal upon cooling from the welding operation. This take-up of the metal in cooling compensates for the expansion and prevents undue stresses being set up in the seam or wrinkling of the metal adjacent the seam. Any further straightening of the seam necessary may be readily accomplished in a die, press, or sizing machine.

Various modifications of the invention may be made within the scope of the accompanying claims.

I claim:

1. In electric flash welding of thin sheet metal edges of substantial length, the method of maintaining accurate transverse alignment of the opposed edge portions during welding which comprises providing in the opposite edge portions like predetermined wave-like deformations, longitudinally of the edges and arranging said deformations with the edges thereof in continuous opposed relation to each other.

2. In electric flash welding of thin sheet metal edges of substantial length, the method of maintaining accurate transverse alignment of the opposed edge portions during welding which comprises arranging the edges in continuous opposed relation, and clamping the sheets adjacent the edges and providing in the opposite edge portions like predetermined wave-like deformations longitudinally of the edges, said clamping operation being adapted to maintain the wave-like contour of the opposed edges throughout the welding operation.

3. In electric flash welding of substantially straight thin sheet metal edges of substantial length, the method of maintaining accurate transverse alignment of the opposed edge portions during welding, which comprises providing in the opposite edge portions like predetermined shallow wave-like deformations in continuous edge opposing relation longitudinally of the edges.

HENRY MILLER.